United States Patent
Yamaguchi et al.

(10) Patent No.: US 6,374,899 B1
(45) Date of Patent: Apr. 23, 2002

(54) METHOD AND APPARATUS FOR PRODUCTION OF CAST ARTICLE HAVING SMALL HOLE

(75) Inventors: Tadashi Yamaguchi, Sendai; Masaki Sato, Funabashi; Hidenobu Nagahama, Kurobe, all of (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/697,421

(22) Filed: Oct. 27, 2000

(30) Foreign Application Priority Data

Nov. 4, 1999 (JP) .............................. 11-313448

(51) Int. Cl.$^7$ .............................. B22D 29/00; B22C 9/10
(52) U.S. Cl. .......................... 164/132; 164/30; 164/369
(58) Field of Search ................................. 164/132, 344, 164/345, 30, 228, 351, 369, 461, 465

(56) References Cited

U.S. PATENT DOCUMENTS

| | | | | |
|---|---|---|---|---|
| 1,387,291 A | * | 8/1921 | Morse | 164/132 |
| 1,710,534 A | * | 4/1929 | Field | 164/132 |
| 2,362,875 A | * | 11/1944 | Zahn | 164/132 |
| 2,897,556 A | | 8/1959 | Chini | |
| 2,907,084 A | | 10/1959 | Wood | |
| 4,352,387 A | | 10/1982 | Yamaguchi | |
| 4,540,601 A | * | 9/1985 | Nath | 427/163 |
| 5,201,357 A | * | 4/1993 | Kuhn et al. | 164/132 |
| 5,882,427 A | * | 3/1999 | Pickering et al. | 204/293 |

FOREIGN PATENT DOCUMENTS

| | | |
|---|---|---|
| EP | 0 851 253 A2 | 7/1998 |
| GB | 2 019 756 A | 11/1979 |
| JP | 5 613 0709 | 10/1981 |
| JP | A-10186176 | 12/1996 |

OTHER PUBLICATIONS

European Search Report for EP Application No. 00 30 9698 dated Mar. 16, 2001.

* cited by examiner

Primary Examiner—M. Alexandra Elve
Assistant Examiner—Len Tran
(74) Attorney, Agent, or Firm—Finnegan, Henderson, Farabow, Garrett & Dunner, L.L.P.

(57) ABSTRACT

A method for the production of a cast article having a small hole comprises the steps of setting a linear core member in a cavity of a metal mold, injecting a molten metal into the cavity, and drawing out the core member from the resultant cast product to form a small hole. A linear core member having a surface film formed by surface coating or by subjecting to a surface treatment is used so that the surface film is partly or as a whole peeled off the linear core member upon drawing it from the cast product, thereby enabling the core member to be drawn from the inside of the cast product. Alternatively, the linear core member is so constructed as to elastically deform in the drawing direction upon drawing it from the cast product to have a diameter smaller than the original diameter.

10 Claims, 4 Drawing Sheets

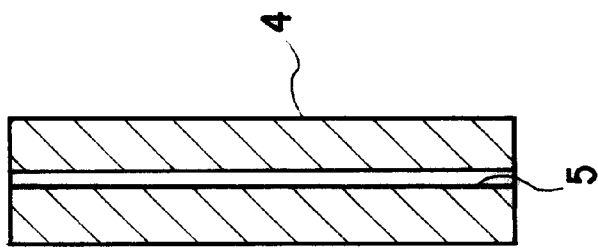
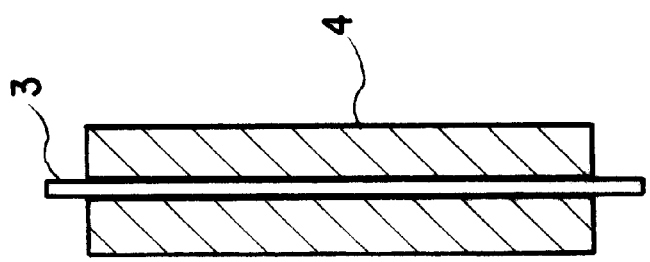
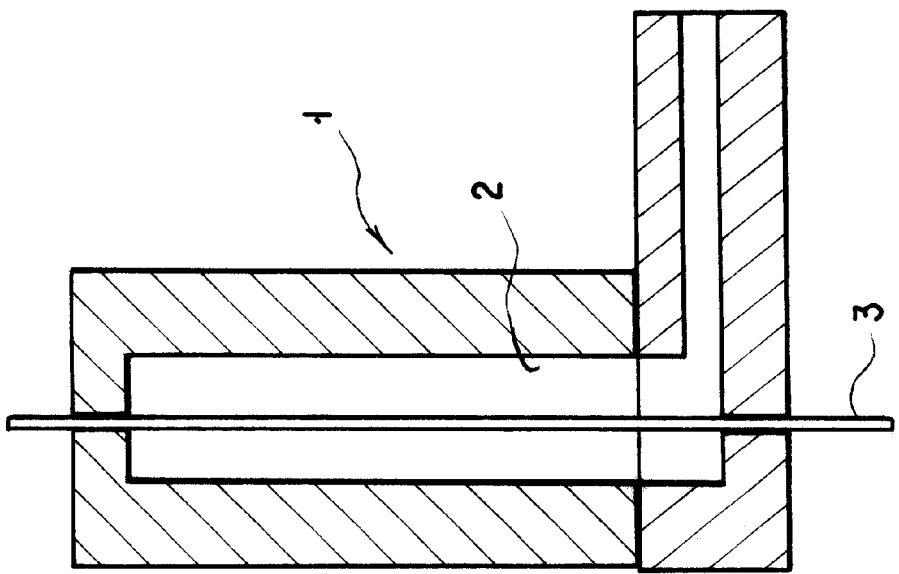

METHOD AND APPARATUS FOR PRODUCTION OF CAST ARTICLE HAVING SMALL HOLE

BACKGROUND OF THE INVENTION

1. Field of the Invention

This invention relates to a method and apparatus for the production of a cast article having a small hole. More particularly, this invention relates to a metal mold casting technique, particularly to a small hole forming technique usable in the production of a molded article having a small hole by metal mold casting of an amorphous alloy (metal glass), particularly an optical connector parts such as a ferrule and a capillary.

2. Description of the Prior Art

As a typical example of a molded article which has a small hole and which requires high dimensional accuracy, a ferrule or capillary of an optical connector may be cited.

Now referring to the attached drawings for explanation, FIG. 1 illustrates one mode of the optical connector ferrule 10 of a one-piece construction comprising a capillary part 11 and a flange part 12. Specifically, this ferrule 10 is composed of the capillary part 11 which has formed along the axis thereof a through-hole 13 of a small diameter intended for the insertion of an optical fiber 17 (or the basic thread of an optical fiber coated with a plastic thin film) and the flange part 12 which has formed along the axis thereof a through-hole 14 of a large diameter intended for the insertion of a sheathed optical fiber 16 (the optical fiber coated with a sheath). The through-hole 13 of the small diameter and the through-hole 14 of the large diameter are connected into each other through a tapered part 15. The connection of a pair of optical fibers 17, 17 is attained by inserting into a split sleeve 18 through the opposite ends thereof the ferrules 10, 10 having the optical fibers already inserted and joined therein and then abutting the end parts of the ferrules 10, 10. As a result, the optical fibers 17, 17 are allowed to have their leading ends abutted and joined in a state having the axes thereof aligned to each other.

FIG. 2 illustrates another mode of the optical connector ferrule 10a comprising a capillary part 11a and a flange part 12a as separate components.

The diameter of the small hole into which the optical fiber is inserted depends on the type of ferrule. For instance, the capillary (ferrule) of the SC type has a small hole of 0.126 mm in diameter and 10 mm in length.

Heretofore, the ferrules are manufactured by using ceramics such as zirconia. The formation of a small hole in the ferrule is attained by preparatorily forming a ceramic ferrule blank having a relatively smaller hole by injection molding, calcining the ceramic ferrule blank, and then subjecting the calcined ceramic ferrule blank to wire lapping thereby finishing it to a specified dimension. Furthermore, the production of the ceramic ferrule comprises, besides the above inside diameter finishing, many steps of machining such as abrasive finishing of the outside diameter and polishing of the leading end into the spherical convex surface (PC polishing). Accordingly, the process of production is lengthy and the cost of production is inevitably large.

As a method capable of solving the problems mentioned above, the assignee of this application has proposed a method which, by the combination of the conventional technique based on the metal mold casing method with an amorphous alloy exhibiting a glass transition region, allows an amorphous alloy molded article satisfying a predetermined shape, dimensional accuracy, and surface quality to be mass-produced with high efficiency by a single process, even when the article is that having a small hole such as an optical connector ferrule or an article having a complicated shape (Japanese Patent Application, KOKAI (Early Publication) No. 10-186176). In the method for the production of the amorphous alloy molded article having a small hole disclosed in this patent literature, basically the formation of the small hole is effected by injecting a melt of a material capable of producing an amorphous alloy into a mold cavity having a core pin set therein at a high speed and thereafter the core pin is drawn from the resultant cast product to form a small hole.

SUMMARY OF THE INVENTION

To manufacture a cast article having a small hole, usually a core pin uniformly coated with a release agent should be used. Since the release agent used evaporates rapidly when the molten metal contacts the core pin, however, bubbles or blemishes remain in the cast article. Furthermore, the direction of evaporation of the release agent can not be uniformly and constantly controlled, which poses the problem that the dimensional accuracy of the small hole portion can not be heightened to a desired level. Conversely, when the injection pressure during the casting is increased to obtain the cast article with high accuracy, other problems will be incurred that the core pin can not be drawn out from the cast product because any gap will not remain between the cast material and the core pin for forming the small hole. Further, this process has the problem of exposing the core pin to the possibility of sustaining scarring in its surface or even breakage during the casting or during the operation of drawing of the core pin after casting. Since the core pin is made of a sintered hard metal or cemented carbide and thus expensive, the fact that the scarred or broken core pin can not be used repeatedly forms a large factor for boosting the production cost of the article.

Such problems are not particular to the optical connector ferrule or capillary, but common to the metal mold casting of a metal molded article having a small hole.

It is, therefore, a fundamental object of the present invention to provide a method and apparatus capable of producing a cast article having a small hole at low cost with high productivity in a short time, which can diminish various problems caused by the difficulty of drawing of a core pin from the cast product after the casting or the durability of the core pin as mentioned above.

A further particular object of the present invention is to provide a method and apparatus which allow a molded article satisfying a predetermined shape, dimensional accuracy, and surface quality to be molded by a simple process even when the article is an amorphous alloy molded article having a slender hole and, therefore, enable to provide an inexpensive amorphous alloy molded article having a small hole and excelling in the durability, mechanical strength, resistance to impact and the like, particularly an optical connector part such as a ferrule or capillary.

To accomplish the object mentioned above, the first aspect of the present invention provides a method for the production of a cast article having a small hole.

The first embodiment of the method according to the present invention is characterized by the fact that in the casting of a molten metal into a cavity of a metal mold having a linear core member of a desired cross-sectional shape preparatorily set therein to produce a cast product, a linear core member having a surface film formed by surface coating or by subjecting to a surface treatment is used as the linear core member, and the linear core member is drawn out from the cast product after the casting, thereby forming in the cast product a small hole of the cross-sectional shape substantially equal to that of the linear core member. In this case, the preferred mode is constructed so that a part or the whole of the surface film is peeled off the surface of the linear core member upon drawing it from the cast product after the casting, thereby enabling the linear core member to be drawn from the inside of the cast product.

The second embodiment of the method of the present invention is characterized by the fact that in the method comprising injecting a molten metal into a cavity of a metal mold having a linear core member of a desired cross-sectional shape preparatorily set therein to produce a cast product and drawing out the linear core member from the cast product to form a small hole having the cross-sectional shape of the linear core member, the linear core member is so constructed as to elastically deform in the drawing direction to have a diameter smaller than the original diameter upon drawing the linear core member from the cast product after the casting, thereby enabling the linear core member to be drawn from the inside of the cast product.

The second aspect of the present invention provides an apparatus for the production of a cast article having a small hole characterized by comprising a metal mold provided with a cavity which defines the outer shape of an article, a movable cylindrical guide member having a center bore and disposed in the mold slidably so as to project into and draw back from the cavity, and a linear core member to be set in the mold via the center bore of the cylindrical guide member, and preferably further means for applying a tension load, preferably not more than 1960 N/mm$^2$, to the linear core member in its longitudinal direction.

By using the method and apparatus mentioned above, it is possible to manufacture a cast article having a small hole, particularly an amorphous alloy moled article, more particularly an optical connector ferrule or capillary, with high productivity.

BRIEF DESCRIPTION OF THE DRAWINGS

Other objects, features, and advantages of the invention will become apparent from the following description taken together with the drawings, in which:

FIGS. 3A to 3C are fragmentary cross-sectional views schematically illustrating an embodiment of the steps of production of a cast article according to the present invention;

DETAILED DESCRIPTION OF THE PREFERRED EMBODIMENTS

Figure 1:
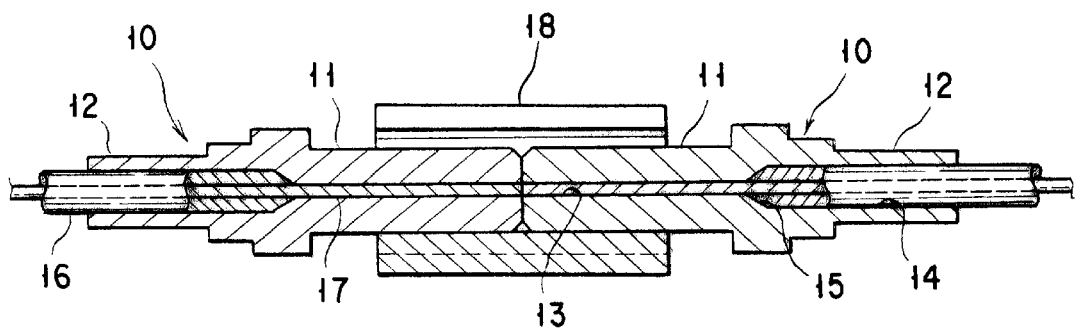
FIG. 1 is a fragmentary cross-sectional view schematically illustrating an optical connector ferrule of a one-piece construction comprising a capillary part and a flange part.
Figure 2:
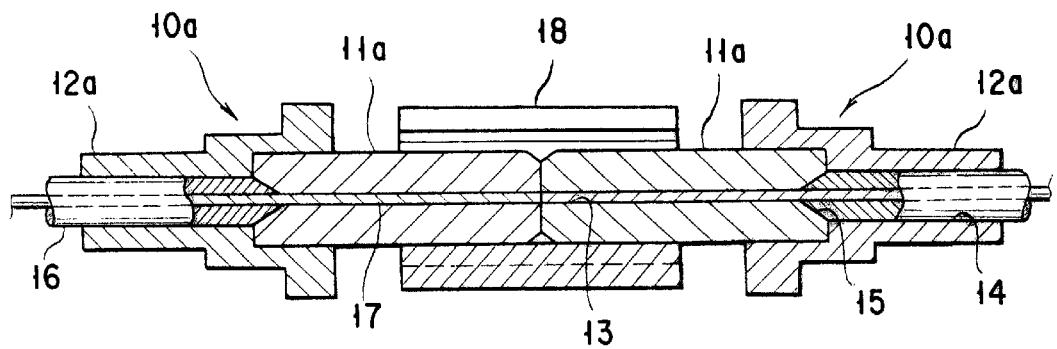
FIG. 2 is a fragmentary cross-sectional view schematically illustrating another optical connector ferrule comprising a capillary part and a flange part as separate components.

In view of the problems caused by the difficulty of drawing of a linear core member from a cast product after the casting or by the durability of the linear core member as mentioned above, the method for the production of the cast article according to the present invention improves the drawing characteristics of the linear core member. The following methods may be cited as the methods for improving the drawing characteristics of the linear core member after the casting. In the following description, the linear core member is referred to as "wire".

(1) Method for Subjecting the Wire to Surface Coating or Surface Treatment

This method is to coat the surface of the wire with a easily peelable film or to utilize the wire having a surface film inevitably formed during the production thereof so that the wire as the linear core member tends to be easily separated from the cast product. By this method, when the wire is drawn from the cast product, the surface film is partly or as a whole peeled off the wire because the surface film of the wire is closely attached to the cast product and, therefore, only the wire is separated from the cast product. As a result, a small hole having the cross-sectional shape of the wire is formed in the cast article.

The surface film of the wire mentioned above may be formed by a method of depositing a material, such as oxides, nitrides, and carbides, on the surface of the wire as by a physical vapor deposition process (PVD) and a chemical vapor deposition process (CVD), or by other suitable method such as electroplating, electroless plating, and hot dipping of metal. When the wire is made of an active metallic material, the wire having a film of oxides, nitrides, or carbides containing a component element of the wire remained as a scale may be utilized as it is, without the need of a specific treatment in the production process. The film thickness is desired to be in the range of about 0.5 μm to about 100 μm in terms of the peelable characteristics of the film and the drawing characteristics of the wire. In this method, various materials can be used as the wire material. Among the other wire materials, the Ti-based alloys having excellent heat resistance prove to be particularly advantageous.

(2) Method Using an Elastic Wire or a Superelastic Wire

This method is to utilize a wire having a high elastic limit as the wire (linear core member). By using such a wire, the wire is elastically deformed in the drawing direction when it is drawn from the cast product and thus its diameter becomes small relative to a small hole to be formed in the cast product. As a result, the wire can be drawn from the cast product because a clearance can be secured between the wire and the cast product, and the small hole having the cross-sectional shape of the wire is formed in the cast molded article. As the wire mentioned above, a material for spring, a high tensile strength steel, and a superelastic material (Ni—Ti superelastic alloys etc.), for example, may be used.

Incidentally, the aforementioned methods (1) and (2) may be employed in combination.

According to the present invention, in order to protect the wire (linear core member) when it is set in the cavity of a metal mold or during the casting process, it is possible to use a metal mold provided with a movable cylindrical guide member which is disposed in the mold slidably so as to project into and draw back from the cavity. When the wire is set in the cavity of the mold together with the cylindrical guide member by inserting it through a center bore of the guide member, a tension load of a desired level, preferably not more than about 1960 N/mm², is applied to the wire in its longitudinal direction. By using such a cylindrical guide member, a part of the wire covered with the guide member is protected from the contact with the molten metal and the surface area of the wire being in contact with the cast product becomes small. As a result, the proportion of the scarring or breakage of the wire during the drawing step decreases. Moreover, since a tension load is applied to the wire, the incidental bending of the wire during the injection of the molten metal into the cavity of the mold is prevented. Accordingly, it is possible to manufacture a cast article having a small hole with high accuracy. Incidentally, this method can be employed in combination with either or both of the methods mentioned above.

The size of the wire may be arbitrarily varied depending on the desired diameter of the small hole. In the case of optical connector parts, the size of the wire is set in the range of 0.025 mm to 1 mm in diameter.

Although the casting material used in the method of the present invention does not need to be limited to any particular substance but may be any of the materials which can be used in the conventional casting method, a substantially amorphous alloy containing an amorphous phase in a volumetric ratio of at least 50% can be advantageously used. Among other amorphous alloys answering this description, the amorphous alloy having a composition represented by either one of the following general formulas (1) to (6) can be more advantageously used.

$$M^1_a M^2_b Ln_c M^3_d M^4_e M^5_f \quad (1)$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$.

The above amorphous alloy includes those represented by the following general formulas (1-a) to (1-p).

$$M^1_a M^2_b \quad (1\text{-a})$$

This amorphous alloy has large negative enthalpy of mixing and good producibility of the amorphous structure due to the coexistence of the $M^2$ element and Zr or Hf.

$$M^1_a M^2_b Ln_c \quad (1\text{-b})$$

The addition of a rare earth element to the alloy represented by the above general formula (1-a), as in this amorphous alloy, enhances the thermal stability of the amorphous structure.

$$M^1_a M^2_b M^3_d \quad (1\text{-c})$$

$$M^1_a M^2_b Ln_c M^3_d \quad (1\text{-d})$$

The filling of gaps in the amorphous structure with the $M^3$ element having a small atomic radius (Be, B, C, N, or O), as in these amorphous alloys, makes the structure stable and enhances the producibility of the amorphous structure.

$$M^1_a M^2_b M^4_e \quad (1\text{-e})$$

$$M^1_a M^2_b Ln_c M^4_e \quad (1\text{-f})$$

$$M^1_a M^2_b M^3_d M^4_e \quad (1\text{-g})$$

$$M^1_a M^2_b Ln_c M^3_d M^4_e \quad (1\text{-h})$$

The addition of a high melting metal, $M^4$ (Ta, W, or Mo) to the above alloys, as in these amorphous alloys, enhances the heat resistance and corrosion resistance without affecting the producibility of the amorphous structure.

$$M^1_a M^2_b M^5_f \quad (1\text{-i})$$

$$M^1_a M^2_b Ln_c M^5_f \quad (1\text{-j})$$

$$M^1_a M^2_b M^3_d M^5_f \quad (1\text{-k})$$

$$M^1_a M^2_b Ln_c M^3_d M^5_f \quad (1\text{-l})$$

$$M^1_a M^2_b M^4_e M^5_f \quad (1\text{-m})$$

$$M^1_a M^2_b Ln_c M^4_e M^5_f \quad (1\text{-n})$$

$$M^1_a M^2_b M^3_d M^4_e M^5_f \quad (1\text{-o})$$

$$M^1_a M^2_b Ln_c M^3_d M^4_e M^5_f \quad (1\text{-p})$$

These amorphous alloys containing a noble metal, $M^5$ (Au, Pt, Pd, or Ag) will not be brittle even if the crystallization occurs.

$$Al_{100-g-h-i} Ln_g M^6_h M^3_i \quad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 \leq h \leq 55$, and $0 \leq i \leq 10$.

The above amorphous alloy includes those represented by the following general formulas (2-a) and (2-b).

$$Al_{100-g-h} Ln_g M^6_h \quad (2\text{-a})$$

This amorphous alloy has large negative enthalpy of mixing and good producibility of the amorphous structure.

$$Al_{100-g-h-i} Ln_g M^6_h M^3_i \quad (2\text{-b})$$

This amorphous alloy has a stable structure and enhanced producibility of the amorphous structure due to the filling of gaps in the amorphous structure with the $M^3$ element having a small atomic radius (Be, B, C, N, or O).

$$Mg_{100-p} M^7_p \quad (3)$$

wherein $M^7$ represents at least one element selected from the group consisting of Cu, Ni, Sn, and Zn; and p represents an atomic percentage falling in the range of $5 \leq p \leq 60$.

This amorphous alloy has large negative enthalpy of mixing and good producibility of the amorphous structure.

$$Mg_{100-q-r} M^7_q M^8_r \quad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$.

The filling of gaps in the amorphous structure of the alloy of the above general formula (3) with the $M^8$ element having a small atomic radius (Al, Si, or Ca), as in this amorphous alloy, makes the structure stable and enhances the producibility of the amorphous structure.

  (5)

  (6)

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

The addition of a rare earth element to the alloy of the general formula (3) or (4) mentioned above, as in these amorphous alloys, enhances the thermal stability of the amorphous structure.

Among other amorphous alloys mentioned above, the Zr—TM—Al and Hf—TM—Al (TM: transition metal) amorphous alloys having very wide differences between the glass transition temperature (Tg) and the crystallization temperature (Tx) exhibit high strength and high corrosion resistance, possess wide supercooled liquid ranges (glass transition ranges), $\Delta Tx=Tx-Tg$, of not less than 30 K, and extremely wide supercooled liquid ranges of not less than 60 K in the case of the Zr—TM—Al amorphous alloys. In the above temperature ranges, these amorphous alloys manifest very satisfactory workability owing to viscous flow even at such low stress not more than some tens MPa. They are characterized by being produced easily and very stably as evinced by the fact that they are enabled to furnish an amorphous bulk material even by a casting method using a cooling rate of the order of some tens K/s. By the molding process utilizing the viscous flow resorting to the glass transition range as well, these alloys produce amorphous materials and permit very faithful reproduction of the shape and size of a molding cavity of a metal mold.

The Zr—TM—Al and Hf—TM—Al amorphous alloys to be used in the present invention possess very large range of $\Delta Tx$, though variable with the composition of alloy and the method of determination. The $Zr_{60}Al_{15}Co_{2.5}Ni_{7.5}Cu_{15}$ alloy (Tg: 652K, Tx: 768K), for example, has such an extremely wide $\Delta Tx$ as 116 K. It also offers very satisfactory resistance to oxidation such that it is hardly oxidized even when it is heated in the air up to the high temperature of Tg. The Vickers hardness (Hv) of this alloy at temperatures from room temperature through the neighborhood of Tg is up to 460 (DPN), the tensile strength thereof is up to 1,600 MPa, and the bending strength thereof is up to 3,000 MPa. The thermal expansion coefficient, $\alpha$ of this alloy from room temperature through the neighborhood of Tg is as small as $1 \times 10^{-5}$/K, the Young's modulus thereof is 91 GPa, and the elastic limit thereof in a compressed state exceeds 4–5%. Further, the toughness of the alloy is high such that the Charpy impact value falls in the range of 60–70 kJ/m². This alloy, while exhibiting such properties of very high strength as mentioned above, has the flow stress thereof lowered to the neighborhood of 10 MPa when it is heated up to the glass transition range thereof. This alloy, therefore, is characterized by being worked very easily and being manufactured with low stress into minute parts and high-precision parts complicated in shape. Moreover, owing to the properties of the so-called glass (amorphous) substance, this alloy is characterized by allowing manufacture of formed (deformed) articles with surfaces of extremely high smoothness and having substantially no possibility of forming a step which would arise when a slip band appeared on the surface as during the deformation of a crystalline alloy.

Generally, an amorphous alloy begins to crystallize when it is heated to the glass transition range thereof and retained therein for a long time. In contrast, the aforementioned alloys which possess such a wide $\Delta Tx$ range as mentioned above enjoy a stable amorphous phase and, when kept at a temperature properly selected in the $\Delta Tx$ range, avoid producing any crystal for a duration up to about two hours. The user of these alloys, therefore, does not need to feel any anxiety about the occurrence of crystallization during the standard molding process.

The aforementioned alloys manifest these properties unreservedly during the course of transformation thereof from the molten state to the solid state. Generally, the manufacture of an amorphous alloy requires rapid cooling. In contrast, the aforementioned alloys allow easy production of a bulk material of a single amorphous phase from a melt by the cooling which is effected at a rate of about 10 K/sec. The solid bulk material consequently formed also has a very smooth surface. The alloys have transferability such that even a scratch of the order of microns inflicted by the polishing work on the surface of a metal mold is faithfully reproduced.

When the aforementioned alloys are adopted as the casting material, therefore, the metal mold to be used for producing the molded article is only required to have the surface thereof adjusted to fulfill the surface quality expected of the molded article because the cast product faithfully reproduces the surface quality of the metal mold. In the conventional metal mold casting method, therefore, these alloys allow the steps for adjusting the size and the surface roughness of the molded article to be omitted or diminished.

The characteristics of the aforementioned amorphous alloys including in combination relatively low hardness, high tensile strength, high bending strength, relatively low Young's modulus, high elastic limit, high impact resistance, high resistance to abrasion, smoothness of surface, and highly accurate castability or workability render these alloys appropriate for use as the material for the molded articles used in various fields such as, for example, a ferrule or a sleeve for the optical connector. Furthermore, an amorphous alloy possesses highly accurate castability and machinability as well as excellent transferability capable of faithfully reproducing the contour of the cavity of the mold. It is, therefore, possible to manufacture the molded article satisfying dimensional prescription, dimensional accuracy, and surface quality by the metal mold casting method or molding method with high mass productivity by a single process insofar as the metal mold to be used is suitably prepared. The excellent transferability of the amorphous alloy capable of faithfully reproducing the contour of the cavity of the mold, however, means that there is little gap between the surface of the cavity of the mold and the cast product. This fact, therefore, poses the problem that the core pin is injured or broken when the cast product is extracted from the mold, because the core pin used for forming a small hole is so slender as to have insufficient strength, as mentioned above. Since the present invention solves this problem, it is particularly advantageously applicable to the production of the amorphous alloy molded article having a small hole.

As a metallic material used for the production of the cast article according to the present invention, alloys for die casting such as Al-based alloys, Mg-based alloys, Zn-based alloys, Fe-based alloys, Cu-based alloys, titanium alloys and the like may be advantageously used besides amorphous alloys mentioned above. Such alloys for die casting are used in the conventional casting process and inexpensive in comparison with ceramics and amorphous alloys commonly used for the production of the optical connector parts. By using such alloys for die casting, the optical connector parts may be easily produced by molding the alloy under pressure in a metal mold by means of a die casting machine.

As Al-based alloys, Al—Si, Al—Mg, Al—Si—Cu, or Al—Si—Mg aluminum alloys for die casting such as, for example, ADC1, ADC5, and ADC12 according to JIS (Japanese Industrial Standard) class symbol may be advantageously used. Among other alloys mentioned above, ADC12 proves to be particularly advantageous. Likewise, as Mg-based alloys, Mg—Al or Mg—Al—Zn magnesium alloys for die casting such as, for example, MDC1A, MDC2A, and MDC3A may be advantageously used. Among other alloys mentioned above, MDC1A proves to be particularly advantageous. As Zn-based alloys, Zn—Al, Zn—Al—Cu, Zn—Al—Cu—Mg, or Zn—Mn—Cu zinc alloys for die casting such as, for example, AG40A, AG41A, and high Mn alloys may be advantageously used. Among other alloys mentioned above, high Mn alloys prove to be particularly advantageous. As Fe-based alloys, gray cast iron, austenite cast iron, and stainless cast steel, for example, may be cited. Among other alloys mentioned above, stainless cast steel proves to be particularly advantageous. As Cu-based alloys, brass, bronze, and aluminum bronze, for example, may be cited. Among other alloys mentioned above, aluminum bronze proves to be particularly advantageous. Typical examples of titanium alloys include α type alloys, β type alloys, and α+β type alloys. Among other alloys mentioned above, α+β type alloys prove to be particularly advantageous.

Among other alloys enumerated above, Fe—M—X alloys represented by the following general formula prove to be particularly advantageous.

$$Fe_xM_yX_z$$

wherein M represents Ni and/or Co, X represents at least one element selected from the group consisting of Mn, Si, Ti, Al, and C, and x, y, and z stand for weight percentages in the ranges of $30 \leq y \leq 40$, $0 \leq z \leq 10$, x being the balance inclusive of unavoidable impurities. Since the Fe—M—X alloys represented by the above general formula permit easy machining with high dimensional accuracy and have a coefficient of linear thermal expansion approximating to that of an optical fiber, they are suitable as the material for ferrules into which the optical fiber is fixed.

Then, some embodiments according to the present invention will be described more concretely below with reference to the drawings.

FIG. 3A illustrates the schematic construction of one mode of embodying a method and apparatus for the production of the cast article having a small hole according to the present invention. In the FIGS., 3A and 3B, reference numeral 1 denotes a split metal mold provided with a cavity 2 adapted to define the outside dimension of a product, and 3 denotes an elongated wire (linear core member) subjected to surface coating or surface treatment or a wire (linear core member) made of a material having a high elastic limit.

The mold 1 can be made of such metallic material as copper, copper alloy, sintered hard metal or cemented carbide and may have disposed therein such a flow channel as allow flow of a cooling medium or heating medium of fluid, gas, etc. The wire 3 may have the surface coated with a film of $TiO_2$, TiN, TiC, etc. or may be made of such a material as spring steels, high tensile strength steels, and superelastic materials, or the wire may be made of the material having the above two characteristics in combination.

Incidentally, for the purpose of preventing the molten metal from forming an oxide film, it is preferred to dispose the apparatus in its entirety in a vacuum or an atmosphere of an inert gas such as Ar gas or establish a stream of an inert gas in the molten metal injection region.

In the production of the cast article, a molten metal (not shown) is injected into the cavity 2 of the mold 1 to cast a product. After the mold is cooled until the temperature of the mold is lowered to a level of not more than the melting point of the molten metal (not more than the glass transition temperature (Tg) in the case of an amorphous alloy), the mold 1 is separated to allow extraction of the cast product 4 holding the wire 3, as shown in FIG. 3B.

Thereafter, the wire 3 is drawn out from the resultant cast product to obtain the cast article 4 having a small hole 5, as shown in FIG. 3C.

Figure 4:
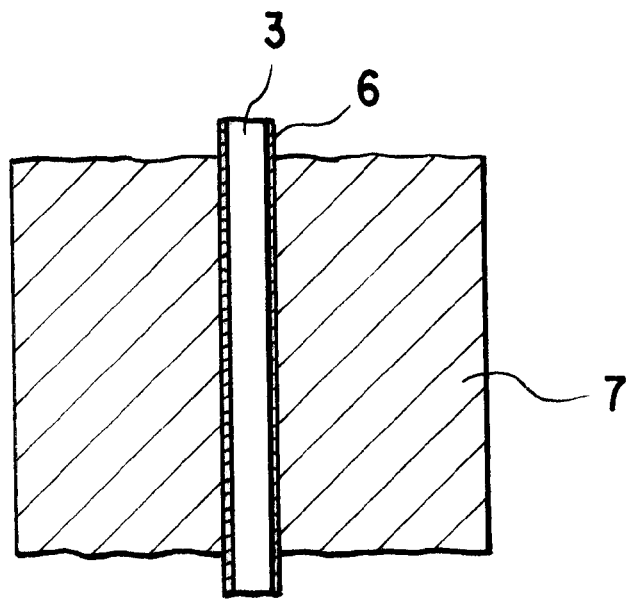
FIG. 4 is a fragmentary cross-sectional view schematically illustrating another embodiment of the method according to the present invention using a linear core member coated with a surface film.

FIG. 4 illustrates an embodiment which uses the wire 3 coated with a surface film 6 of $TiO_2$, TiN, TiC, etc. mentioned above. By using the wire 3 preparatorily coated with such surface film 6, when the wire is drawn, only the wire 3 can be drawn out from the cast product 7 owing to the peeling of the surface film 6 from the wire 3, thereby forming a small hole.

Figure 5:
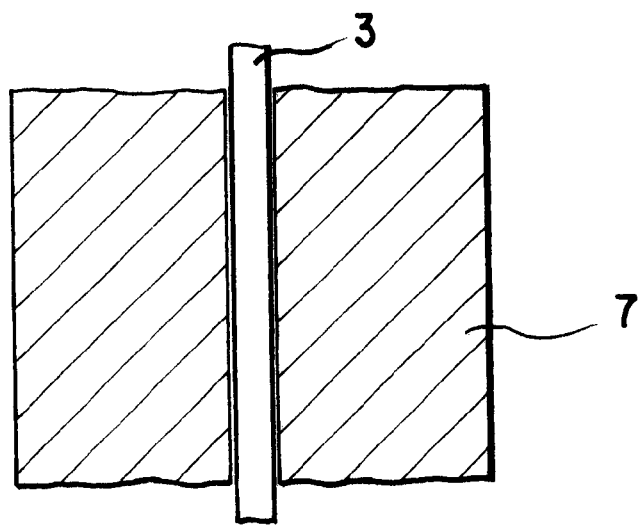
FIG. 5 is a fragmentary cross-sectional view schematically illustrating still another embodiment of the method according to the present invention using a linear core member made of a material easily susceptible of elastic deformation.

FIG. 5 illustrates another embodiment which uses the wire 3 made of a material having a high elastic limit such as spring steels, high tensile strength steels, and superelastic materials. By using the wire 3 made of the material having a high elastic limit, when the wire is drawn, a slight gap is formed between the wire 3 and the cast product 7 because the wire itself deforms elastically. As a result, the wire 3 can be drawn out from the cast product 7 so that a small hole is formed in the cast product.

Figure 6:
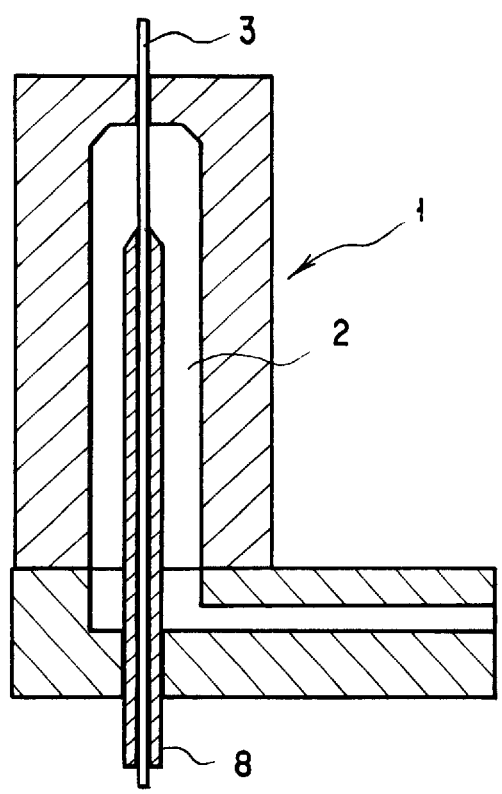
FIG. 6 is a fragmentary cross-sectional view schematically illustrating another embodiment of an apparatus for the production of a cast article according to the present invention.

FIG. 6 illustrates the schematic construction of another mode of embodying the apparatus and method for the production of the cast article according to the present invention. In FIG. 6, reference numeral 8 denotes a movable cylindrical guide member disposed in the mold slidably so as to project into and draw back from the cavity 2 of the mold 1. The wire 3 is set in the cavity 2 of the mold 1 together with the movable cylindrical guide member 8 by inserting through a center bore of the guide member 8. By using such cylindrical guide member 8, a part of the wire 3 covered with the guide member is protected from the contact with the molten metal and the surface area of the wire being in contact with the cast product becomes small. As a result, the proportion of the breakage of the wire 3 during the drawing step remarkably decreases.

Moreover, since a tension load is applied to the wire 3 in the longitudinal direction thereof, the incidental bending of the wire 3 is effectively prevented even when the molten metal flows into the cavity of the mold transversely in relation to the wire 3 or the turbulence of the molten metal occurs in the cavity of the mold. As a result, a small hole may be formed in the cast article with high accuracy.

Figure 7:
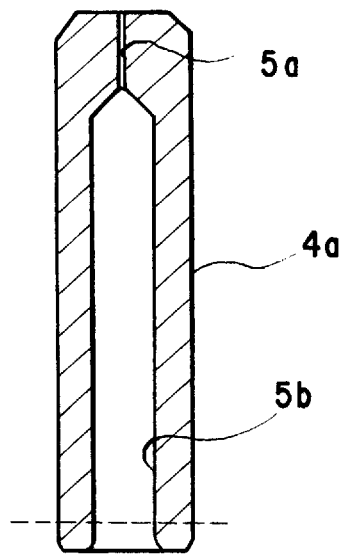
FIG. 7 is a cross-sectional view schematically illustrating a molded article produced by using the apparatus shown in FIG. 6.

FIG. 7 shows the cast article 4a produced by using the apparatus shown in FIG. 6 mentioned above and the lower portion is severed from the cast article. The cast article 4a has a small diameter part 5a and a large diameter part 5b. The length of the large diameter part 5b may be arbitrarily adjusted by changing the length of insertion of the movable cylindrical guide member 8 into the cavity 2 of the mold 1. Incidentally, the small diameter part 5a can be subjected to the wire lapping according to demand.

Although the elongated wire 3 having a uniform diameter in its overall length is used in the embodiments mentioned above, it is also possible to use a wire (linear core member) having a diameter increased stepwise or gradually in the direction of drawing to form a small hole having the inside diameter increased stepwise or gradually in its axial direction. Further, when the movable cylindrical guide member 8 as shown in FIG. 6 is used, it is possible to form the small holes of various cross-sectional shapes by using the guide members having varying cross-sectional shapes. Although the above description was directed to the embodiments of the manufacture of cast articles having a through-hole, it is also possible to manufacture a cast article having a blind hole by adjusting the height of the linear core member to be set in the cavity of the mold (insertion length).

According to the method and apparatus of the present invention, as mentioned above, the problems caused by the difficulty of drawing of the linear core member from the cast product after the casting or the durability of the core member is diminished and a cast article having a small hole can be produced at low cost, with high productivity and in a short time. As a result, the present invention allows a molded article satisfying a predetermined shape, dimensional accuracy, and surface quality to be molded by a simple process even when the article to be produced is an amorphous alloy molded article having a slender hole and, therefore, enables to provide an inexpensive amorphous alloy molded article having a small hole and excelling in the durability, mechanical strength, resistance to impact and the like, particularly an optical connector part such as a ferrule or capillary.

Now, the present invention will be described more concretely below with reference to working examples which have confirmed the effect of the present invention specifically.

EXAMPLE 1

The casting was carried out by using an apparatus as shown in FIG. 3A and a wire of stainless steel, 0.1 mm in diameter, having a coating of $TiO_2$, 10 μm in thickness, formed thereon by the PVD process. An alloy having a composition of $Zr_{55}Al_{10}Ni_5Cu_{30}$ and previously manufactured by melting relevant component metals was subjected to casting in a vacuum of $1.33 \times 10^{-2}$ Pa. A metal mold used had a cylindrical cavity, 2.5 mm in diameter and 10.5 mm in length. After the casting, the cast product was extracted from the mold and the wire was drawn out from the product at a speed of 1.7 mm/sec. to form a small hole. At this step, the load for drawing was 294 $N/mm^2$. According to the observation of the formed hole with a microscope, it has confirmed that the formed small hole had a circular cross-sectional shape of the stainless steel wire.

EXAMPLE 2

The casting was carried out by using a metal mold similar to that used in Example 1 and a wire of titanium, 0.1 mm in diameter, having an oxide film of 5 μm thickness formed on the surface thereof by oxidation. The load for drawing was 98 $N/mm^2$. According to the observation of the formed hole with a microscope, it has confirmed that the formed small hole had a circular cross-sectional shape of the titanium wire.

EXAMPLE 3

The casting was carried out in the same manner as mentioned above by using a wire of 45Ni-55Ti superelastic alloy, 0.1 mm in diameter, having an oxide film of 4 μm thickness formed on the surface thereof. The load for drawing was 785 $N/mm^2$. According to the observation of the formed hole with a microscope, it has confirmed that the formed small hole had a circular cross-sectional shape of the wire.

While certain specific embodiments and working examples have been disclosed herein, the invention may be embodied in other specific forms without departing from the spirit or essential characteristics thereof. For instance, the method explained above manufactures one cast product by a single process using a metal mold provided with one molding cavity. Naturally, the present invention can manufacture two or more cast products by using a metal mold provided with two or more cavities therein. The present invention is not limited to the embodiments mentioned above with respect to the size, shape, and number of the cavities of the mold. Furthermore, the present invention is not limited to the examples of application mentioned above. The described embodiments and examples are therefore to be considered in all respects as illustrative and not restrictive, the scope of the invention being indicated by the appended claims rather than by the foregoing description and all changes which come within the meaning and the range of equivalency of the claims are, therefore, intended to be embraced therein.

The disclosure in Japanese Patent Application No. 11-313448 of Nov. 4, 1999 is incorporated here by reference. This Japanese Patent Application describes the invention described hereinabove and claimed in the claims appended hereinbelow and provides the basis for a claim of priority for the instant invention under 35 U.S.C. 119.

What is claimed is:

1. A method for the production of a cast article having a small hole, comprising the steps of
    setting a linear core member of a desired cross-sectional shape in a cavity of a metal mold,
    injecting a molten metal into the cavity of said metal mold to produce a cast product, and drawing out said linear core member from the cast product to form a small hole having the cross-sectional shape of the linear core member,
    wherein a linear core member having a surface film formed by surface coating or by subjecting to a surface treatment is used as said linear core member, and the linear core member is drawn out from the cast product after the casting, thereby forming in the cast product a small hole of the cross-sectional shape substantially equal to that of the linear core member,
    wherein a tension load is applied to said linear core member set in said mold in the drawing direction and in this state the molten metal is injected into said cavity of the mold,
    wherein said cast material is an alloy containing an amorphous phase in a volumetric ratio of at least 50%.

2. The method according to claim 1, wherein said linear core member is constructed so that a part or the whole of said surface film is peeled off the surface of said linear core member upon drawing the linear core member from the cast product after the casting, thereby enabling the linear core member to be drawn from the inside of the cast product.

3. The method according to claim 1, wherein said surface film of said linear core member is an oxide film, nitride film or carbide film containing a component element of said linear core member.

4. The method according to claim 1, wherein said linear core member is made of a Ti-based alloy.

5. The method according to claim 1, wherein said surface film of said linear core member has a thickness in the range of 0.5 μm to 100 μm.

6. The method according to claim 1, wherein said linear core member has a diameter in the range of 0.025 mm to 1 mm.

7. The method according to claim 1, wherein said tension load is not more than about 1960 N/mm².

8. The method according to claim 1, wherein said alloy is a substantially amorphous alloy having a composition represented by either one of the following general formulas (1) to (6):

$$M^1_a M^2_b Ln_c M^3_d M^4_e M^5_f \quad (1)$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$, $$Al_{100-g-h-i} Ln_g M^6_h M^3_i \quad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 \leq h \leq 55$, and $0 \leq i \leq 10$, $$Mg_{100-p} M^7_p \quad (3)$$

wherein $M^7$ represents at least one element selected from the group consisting of Cu, Ni, Sn, and Zn; and p represents an atomic percentage falling in the range of $5 \leq p \leq 60$, $$Mg_{100-q-r} M^7_q M^8_r \quad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s} M^7_q M^9_s \quad (5)$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s} M^7_q M^8_r M^9_s \quad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

9. The method according to claim 1, wherein said cast material is an alloy for die casting selected from the group consisting of Al-based alloys, Mg-based alloys, Zn-based alloys, Fe-based alloys, Cu-based alloys, and titanium alloys.

10. The method according to claim 1, wherein said cast article is an optical connector part for inserting or holding an optical fiber.

* * * * *